United States Patent

Hauck

[15] 3,673,374
[45] June 27, 1972

[54] SURFACE METAL WELDING PROCESS AND APPARATUS

[72] Inventor: Clifford A. Hauck, Somers, N.Y.

[73] Assignee: Union Carbide Corporation, New York, N.Y.

[22] Filed: April 22, 1970

[21] Appl. No.: 30,947

Related U.S. Application Data

[63] Continuation-in-part of Ser. No. 701,932, Jan. 31, 1968, abandoned, which is a continuation-in-part of Ser. No. 359,952, April 15, 1964, abandoned.

[52] U.S. Cl. ............................................. 219/76, 219/137
[51] Int. Cl. .......................................................... B23k 9/04
[58] Field of Search .................. 219/74, 75, 76, 121, 137

[56] References Cited

UNITED STATES PATENTS

| | | | |
|---|---|---|---|
| 3,336,460 | 8/1967 | Hauck et al. | 219/121 |
| 2,806,124 | 9/1957 | Gage | 219/121 |
| 3,050,616 | 8/1962 | Gage | 219/121 |
| 2,927,990 | 3/1960 | Johnson | 219/76 X |
| 2,330,289 | 9/1943 | Keir | 219/76 |
| 2,003,019 | 5/1935 | Strobel | 219/76 |

Primary Examiner—J. V. Truhe
Assistant Examiner—George A. Montanye
Attorney—Paul A. Rose, Harrie M. Humphreys and Dominic J. Terminello

[57] ABSTRACT

Material is melted in the surface of a metal body by maintaining a plurality of 300 to 10,000 ampere electric arcs, each energizing between an electrode surrounded by a gas cup or nozzle and such surface. The nozzles are positioned about ¼ to about 1 gas cup diameter from the surface. The arcs are swept across the work by self-induced electro-magnetic interaction while providing relative motion between the surface and the arcs. The speed of such motion is correlated with the current of such arcs.

8 Claims, 7 Drawing Figures

SURFACE METAL WELDING PROCESS AND APPARATUS

This application is a continuation-in-part of a application Ser. No. 701,932 filed Jan. 31, 1968, now abandoned, which is in turn a continuation-in-part of application Ser. No. 359,952, filed Apr. 15, 1964, and now abandoned.

This invention relates to a process for arc melting material in the surface of metal bodies and more particularly to a process for cladding a metal body with a surface layer of a dissimilar metal.

As one example, the invention provides for substantially eliminating surface defects in a body of metal in the solid state, which comprises energizing each of a plurality of electric arcs with high current, i.e., a value of at least of the order of 300 amperes, flowing between a gas-shielded electrode and such surface. The adjacent surface metal including such defects is melted with such arcs each in an annular stream of gas which further protects the arcs and the so-melted metal from contamination by the atmosphere, while sweeping such arcs across the work by self-induced electro-magnetic interaction. This sweeping action not only stirs the melt without adversely blowing it away from the solid metal thereunder, but actually retains the molten metal in a substantially smooth and level state to effect a wide coverage of the metal surface. A protective gas blanket is also provided at least until the metal becomes completely solidified, before it is exposed to the atmosphere.

High-chromium alloys require careful surface conditioning prior to hot-rolling in order to insure satisfactory surface quality. Because of their inherent resistance to oxidation, such alloys do not scale readily, hence they retain surface defects which normally are eliminated in the reheating furnaces in the case of more freely scaling metals. Most of the ingot defects causing surface rejections are laps and seams due to metal splashing. Since they are located near the surface, the standard commercial practice is to remove these defects mechanically by grinding with abrasive wheels. More recently, powder scarfing techniques have been developed. However, both processes result in considerable loss of metal.

As another example, the invention provides for melting surface material, such as a preselected composition of powdered material secured by a suitable adhesive to the surface of a metal slab, whereby such material is alloyed with and fused into the base metal. Chromium, for example, could be so alloyed with a carbon steel slab to form a stainless steel alloy at the outer surfaces.

Various processes have been proposed for providing a product having a skin or clad coating of a corrosion resistant quality surface appearance material on a core of a low cost structural material. An example of a particularly useful composite product of this type would be sheet, plate or other stock having a carbon steel core or body and a tight, adherent cladding of stainless steel. This material would presumably have the high surface appearance and corrosion resistance of stainless steel combined with the strength, ductility and low cost of the carbon steel core. Of equal interest would be a practical process for making such composite material.

The high cost of stainless steel sheet is due in large part to the expenses of its difficult fabrication. Attempts have been made to produce a stainless clad-carbon steel slab which could then be rolled to sheet form using conventional carbon steel rolling practice and in that way provide a cheaper composite stainless clad-carbon steel sheet product having many of the properties of a fully stainless sheet.

A more desirable process, if it could be effectively practiced, would be to provide a stainless steel coating on a carbon steel slab by melting stainless alloy constituents, e.g. chromium and nickel, etc. into the surface of a carbon steel slab. Assuming that a uniform depth of the stainless clad layer could be produced on the steel slab, this uniform and integral slab could then be expected to undergo fabrication into sheet and other stock with more success than laminated bodies having separate sheets and slabs of different materials. Another advantage of such a process is the use of alloy metal (e.g., Cr.) in low cost form rather than as expensive semifinished stainless plate. However, the provision of such a starting material, i.e., a carbon steel slab clad with an integral or melted-in alloy coating or layer, is an extremely difficult proposition. Electric arcs have been cited as being suitable heat sources for such a job, but a practical process has not been heretofore provided.

It is a main object of this invention, therefore, to provide an improved process for arc melting material in the surface of a metal body.

Another object is to provide an improved process for producing an alloy surface layer on a metal body.

It is a further object of this invention to provide a process for producing an alloy surface layer on a metal body, which composite body will have the properties and structure allowing low cost processing into sheet, plate and strip of exceptional quality.

It is also the object of this invention to provide a process for producing arc-alloyed slabs by means of a highly efficient arc system and alloying process.

It is also an object of this invention to provide an arc-alloyed slab having one or more surface layers formed thereon of a material dissimilar to the base, and having the structure, uniformity and other properties found necessary to allow its processing into high quality clad sheet, plate and strip.

It is a further object of this invention to provide an improved apparatus for producing an alloy surface layer on a metal body using an arc melting system.

Other aims and advantages of this invention will be apparent from the following description, the drawings and the appended claims.

In accordance with these objects a method is provided for alloying a material into at least a selected portion of the surface of a body of a base material wherein a part of the base material becomes a part of the alloy and wherein an alloy layer of substantially uniform depth and composition is formed on said selected portion of the surface of said body, comprising melting a selected continuous lateral expanse of the surface of said body onto which alloying material is introduced by establishing a plurality of arcs at current levels of from 300 to 10,000 amperes from electrodes provided in arc devices which include a nozzle or gas cup having an outlet passage, confining the arc in the nozzle, introducing gas through the nozzle and into the arc, the combination of said gas flow and said outlet passage nozzle diameter providing a directionally stable arc effluent; positioning said directionally stable arc effluents proximately to each other so that the magnetic fields created around each of said arcs effects the arcs in immediate proximity therewith, energizing said arcs such that an AC voltage is applied at least to alternating arcs to produce said interacting magnetic fields among said multi-arcs, spacing said nozzles from about ¼ to about 1 nozzle diameter from the surfaces of said body such that the length of said arcs may be swept across said selected surface portion and varying at least one of said arc current, said gas flow, and said arc length to control the sweep of said arcs, and moving said body and sail plurality of electric arcs relative to one another in a direction from one end of the body to another to advance the molten zone of alloyed material to successive lateral expanses on said body, while allowing already molten lateral expanses to cool under conditions substantially uniform across the entire selected lateral expanse.

In a broader aspect the objects are accomplished by a method of melting material in the surface of a metal body by maintaining a plurality of 300 to 10,000 amperes electric arcs each energized between an electrode surrounded by a gas cup or nozzle and such surface, positioning such nozzles about ¼ to about 1 nozzle diameter from said surface, melting only the adjacent surface material with such arcs each in an annular stream of gas which further protects the arc and so-melted material from contamination by the atmosphere, and sweeping such arcs across the work by self-induced electro-magnetic interaction to retain, stir and level the so-melted material, while providing relative motion between said surface and the arcs the speed of such motion being correlated with the current of said arcs.

Figure 1:
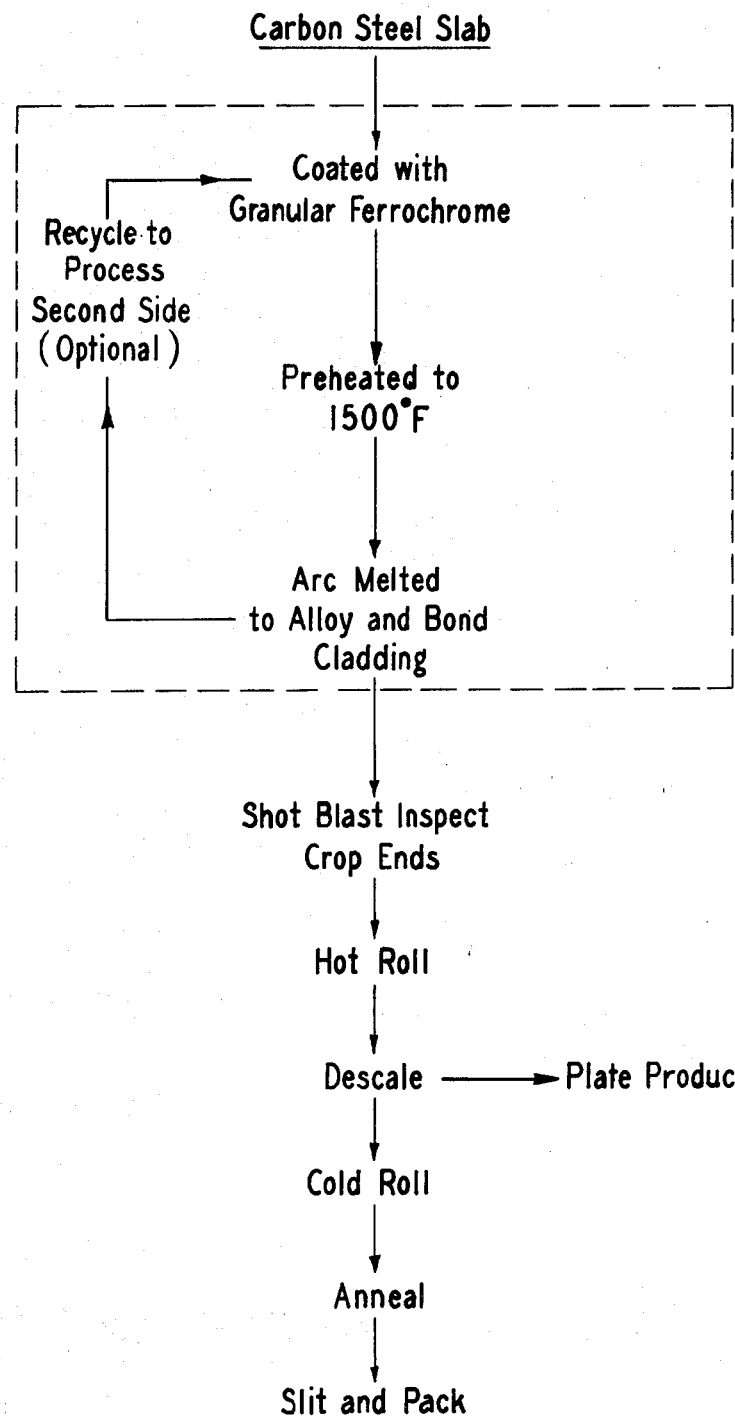
FIG. 1 is a chart outlining typical process steps involved in producing arc-alloyed slab (enclosed in the box), followed by a rolling schedule for producing clad plate or sheets according to this invention.

Referring to the drawings, FIG. 1 shows a chart of the various process steps typically involved in making clad plate or sheet product. The steps relating to the arc alloying process for forming the cladding on the slab are enclosed in the box. The subsequent steps relate to typical procedures for converting such slab to wrought product, namely hot rolling, cold rolling, etc.

According to the process, a carbon steel slab flat enough to hold the molten metal puddle which is to be formed thereon is first provided. Where the clad product will be sheet, a mild steel such as a rimmed or killed steel is generally used because of its good formability and mechanical properties. Higher carbon, firebox grade steels may be employed where clad plate is desired. Slight thicknesses of scale on the slab or minor irregularities in contour will not generally interfere with the arc alloying process and may be tolerated.

The alloy constituent materials, generally in a granular form are then deposited on a surface of the slab. Where the objective is to form a ferritic stainless clad on the slab, then a chromium containing material is used, e.g. a ferrochromium alloy. Of course, other alloy compositions can be formed where needed or desired. For example, a precalculated mixture of ferrochromium and nickel can be used to make an austenitic clad. To form the ferritic, type 430 stainless clad, for example, a Simplex No. 2 ferrochrome of a particle size generally 8 mesh and down may be used. This material has the typical composition shown below.

TABLE I

| | Percent |
|---|---|
| C | 0.03 |
| Si | 2.0 |
| Mn | 0.5 |
| Cr | 70 |
| O | 1.5 |
| K | 0.02 |
| Fe | Bal. |

As seen above this type of ferrochrome has a chromium content of about 70 per cent whereas if a straight chromium stainless is desired, the clad layer should have a chromium content of only about 18 per cent. By controlled melting of the carbon steel base, however, enough additional iron is melted to alloy with the chromium and iron of the granular deposit and thereby produce the desired composition in the clad layer.

The actual amount of ferrochrome which should be deposited on the surface of the carbon steel slab can be determined according to the following formula:

$$\text{Amount of ferrochrome to be added in lbs./in.}^2 \text{ of slab surface} = \frac{\text{Final percent Cr desired} \times \text{clad depth [in.]} \times \text{clad density [lb./in.}^3]}{\text{Percent Cr in ferrochrome used}}$$

The depth of the clad layer desired will, of course, depend on such factors as the type of base material and clad composition involved, slab size and the intended use of the slab, i.e., is it to be processed into sheet, or thick plates, etc. Generally, however, in regard to stainless cladding of carbon steel slabs for rolling into sheet stock, the depth of the clad layer should be about 10 per cent of the slab thickness. For a 5 inch thick slab then, the depth of cladding to be produced would be about 0.5 inch. If an 18 per cent chromium clad is to be provided, then a layer of ferrochrome providing about 0.036 lb/in$^2$ would have to be deposited over the slab surface.

To aid in holding the granular ferrochrome on the slab a suitable binder is employed. For example, a dilute solution of sodium silicate can be sprayed on the slab surface before the ferrochrome is applied, followed by another spraying of sodium silicate binder after the deposition of the granular material. It is to be noted that the alloy constituent material may be provided on the slab surface in forms other than granules. A sheet of a chromium containing material may be placed over the slab surface, or wires, bars, rods, etc. may be used. The granular material, however, appears to be best suited to the process.

The ferrochrome-coated slab is usually preheated to a suitable predetermined temperature. Some preheating of the slab is generally required to prevent cracking or separation of the clad layer. The degree of preheating desired for a particular slab material and clad composition will vary depending on several factors. Preheating to a high temperature in a fuel-fired preheating furnace is generally desired since this will reduce the amount of electric energy needed to melt and alloy the clad layer and will also promote uniformity. For the stainless clad carbon steel being considered here, a preheat temperature of 1,500° F. was satisfactory, although it can be significantly higher or lower.

While the description of the process outlined above has shown the application of the alloy material to the slab before preheating, the alloy material could also be applied after preheating or even during the actual melting process by using suitable material deposition equipment.

The alloy material could be, for example, chromium, nickel, iron, columbium, manganese, molybdenum, tantalum and titanium.

The slab is then delivered to the arc melting station where the arc array shown in the drawings and described hereafter is used to melt the alloy constituent material and underlying portion of the slab itself to form the desired depth of clad layer. While arc melting processes have been contemplated in the past, it is the provision of the improved melting and alloying process used here that makes it commercially possible to obtain composite slabs with clad layers of uniform depth and alloy content as well as the internal structure necessary for good fabrication.

While electric arcs have been used in the past, both singly and in groups, for welding, metal surface treatings, cutting and melting, including surface melting, the electric arc melting and alloying system used herein is particularly adapted to producing a clad slab of the type found necessary for subsequent processing into plate or sheet stock. It has been found that a continuous puddle of molten material formed across the entire lateral expanse of the surface to be treated is preferred rather than allowing the formation of a number of overlapping but separate narrow melt puddles. The system of this invention is particularly adapted to the production of said continuous well mixed melt puddle because of its uniform intense heating of the metal surface and thorough stirring of the alloying and base metal.

While it might seem that uniform heating of a large metal surface could be achieved by merely placing a large number of electric arc producing devices together, such an operation is not easily conducted. Electric arcs, including ordinary gas-shielded electric arcs, tend to be blown, deflected or otherwise undesirably influenced by random magnetic fields and drafts. These unstable arcs are thus uncontrollable and unpredictable, especially when grouped together in close proximity. According to the process of this invention, a plurality of individual directionally stable electric arc columns are arranged to extend over the lateral expanse to be treated. A plurality of these directionally stable arcs can be arrayed over the surface of the slab and positioned so as to obtain an electromagnetically controlled sweeping of the arcs across any selected lateral surface of the slab, producing, in effect, a substantially continuous, sheet-like plasma flame which will uniformly heat, melt and stir said selected expanse of the slab at one time, thereby producing a clad layer on said slab of the desired uniform depth, composition, and solidification structure. The sheet-like plasma flame is then moved relative to the slab in a direction from one end of the slab to the other to advance the molten zone of alloyed metal to successive lateral expanses on said body, with the result that already molten zones of lateral expanse cool under substantially uniform conditions creating a clad layer of optimum metallurgical conditions for subsequent rolling and other metal forming operations.

Generally speaking, whether it be for surface conditioning or for alloying material into the surface of the body the arc torches should be placed as close to the work as possible for more efficient heat transfer, and for more effective utilization of the arc gas. However, because of the sweeping nature of the arcs, the amount of stand-off is critical. If the gas cups or nozzles of the arc torches are too close to the work, the arcs will not sweep. On the other hand, if the standoff is too great, the arcs will attach to the adjacent gas cup. Expressed as a function of the gas cup diameter, it has been found that the standoff distance should be between ¼ and 1 gas cup outside diameter.

The phrase "directionally stable" when used herein and in the claims describes an electric arc column in which the longitudinal axis coincident with the flow of current remains substantially invariant in direction regardless of the surrounding environment such as air drafts, and regardless of intentional relative movement of the arc columns and the workpiece, except that in the presence of intentionally provided magnetic fields, such arc columns can be deflected or swept as desired to form the sheet-like plasma flame.

Figure 2:
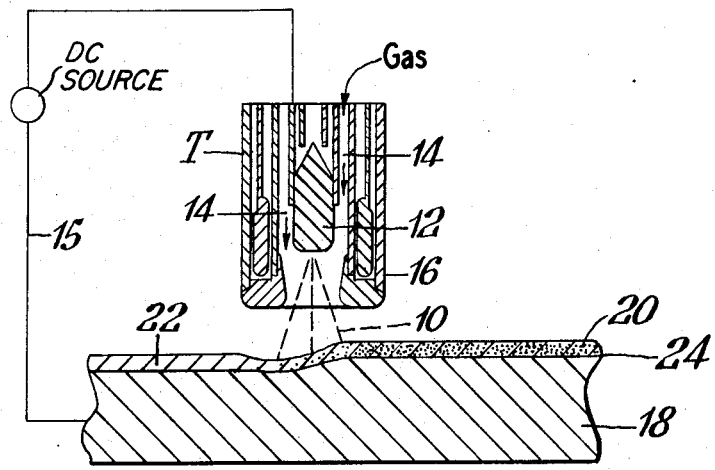
FIG. 2 is a somewhat schematic diagram, in cross section, of an arc alloying operation according to one aspect of this invention.

There are several methods of producing and maintaining the arcs useful in the process of this invention. One such method is disclosed and claimed in U.S. Pat. No. 2,806,124 issued Sept. 10, 1957 to R.M. Gage. As seen in the schematic of FIG. 2, this method comprises establishing an arc 10 from a non-consumable electrode 12, introducing a flow of gas such that at least a portion of the gas stream is directed by means of a cold wall nozzle 16 into intimate contact with the arc thereby directionally stabilizing the arc 10. The slab 18, coated with a granular ferroalloy 20 and generally in a preheated condition, is moved under the arc 10. The heat of the arc melts the granular ferroalloy as well as a portion of the underlying slab metal. The molten metal from the slab is alloyed with the ferroalloy material forming the clad alloy layer 22 which cools and solidifies as it leaves the arc melting zone.

It has been found that a directionally stable arc, such as that produced by the process described in the afore-mentioned patent, is essential for the successful operation of the process here. The directionally stable arc will not wander over the surface of the slab, as will other types of arcs, but will have stiffness and persistence of direction. Additionally, the directionally stable arc column produced as described in the above mentioned patent can be placed closer to an adjacent directionally stable arc column, e.g. as close as about 1⅛ inches, to increase the melting power without danger of arcing to the adjacent device. As will be explained more fully hereafter, open arcs cannot be placed sufficiently close to provide the melting capacity required for this process because of the double arcing tendency of closely situated open arcs, and the tendency for uneven melting due to undesirable arc position resulting from magnetic interaction.

The arc torch device described in the aforementioned patent has the further advantage that the arc-gas effluent issuing therefrom is of high energy density compared to that of an equivalent open arc or ordinary gas shielded arc. This arc-gas effluent thus is capable of faster and more uniform heating and melting of the alloy layer because of its increased energy intensity.

Additionally, the gas flow in said arc-gas effluent serves a useful purpose in protecting the molten puddle and in stirring the alloy materials into the molten portion of the slab as well as pushing away molten material to expose fresh, unmelted areas of the slab for the arcs. However, the amount of gas flow is not so much as to cause severe splashing of the molten metal.

When an arc melting operation was attempted using a row of devices producing open arcs, i.e. non-constricted arcs, it was found that the operation of the system was particularly unstable. The arc columns were strongly attracted or deflected for arc column spacings of 1⅛ inches to 2¼ inches. Increasing the device spacing and decreasing standoff distance over the workpiece was necessary to minimize such arc interactions which, if left uncontrolled, would cause arcing from one device directly to an adjacent device with resulting destruction of the arc devices. It was found with the use of open arc devices in the range of 200 to 400 amperes arc current, that spacings greater than 2¼ inches are required to avoid undesirable arc deflections and device failures. The need for excessive spacings makes it impossible to achieve uniform melting by intense heating and stirring of the conditions across lateral expanse of the slab to be treated. For example, in one prior art system for melting a slab using three open arcs at about 800 amperes each, a spacing of 7½ inches was used. This arrangement generates about 5 kw of energy per inch of pass width and can only proceed at a forward speed of about two-thirds inch per minute. Such a slow rate of forward progress causes wide temperature differentials in the body being melted, i.e., the portions already melted cool and solidify while only slightly forward spaced areas of the body are being melted. Such conditions are not conducive to formation of a clad body having a uniform alloy concentration and solidification structure. Additionally, when large lateral spacings are utilized, as required with open arcs, the areas between the arc columns are not all heated at the same time, even when the open arcs are mechanically oscillated in a side-to-side motion. It has further been found that merely increasing the number of rows of widely-spaced open arc devices would not contribute useful energy in proportion to the increase in total arc power. This is due to the need for maintaining relatively large spacings between the rows of open arc devices. Only a slight increase in forward speed would result and there would be a tendency for the melt between the rows to freeze so that the only contribution made by the preceding row would be that of preheating.

The use of directionally stable, high intensity electromagnetically swept arcs of the type herein makes possible the practical attainment of the high capacity melting system needed to uniformly melt the entire lateral expanse of the slab and thereby produce a composite body fully amenable to further fabrication.

However, it is to be noted that the invention is not to be considered limited to use with the particular directionally stabilized arc effluent produced according to the process described in the above-cited patent. The use of any device or system which will produce a directionally stable and/or constricted arc-gas effluent is within the scope of this invention.

Figure 3:
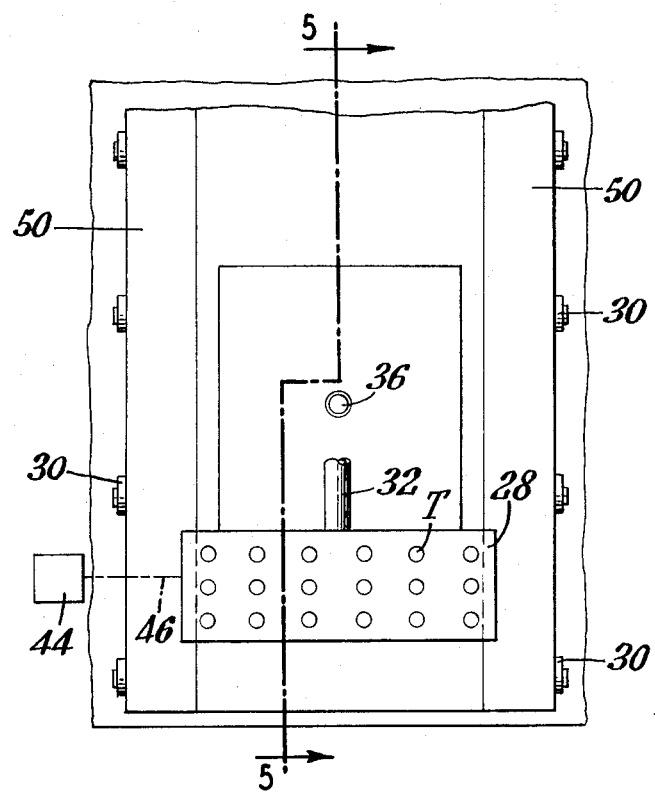
FIG. 3 is a fragmentary plan view of one form of apparatus suitable for carrying out the process of this invention.
Figure 4:
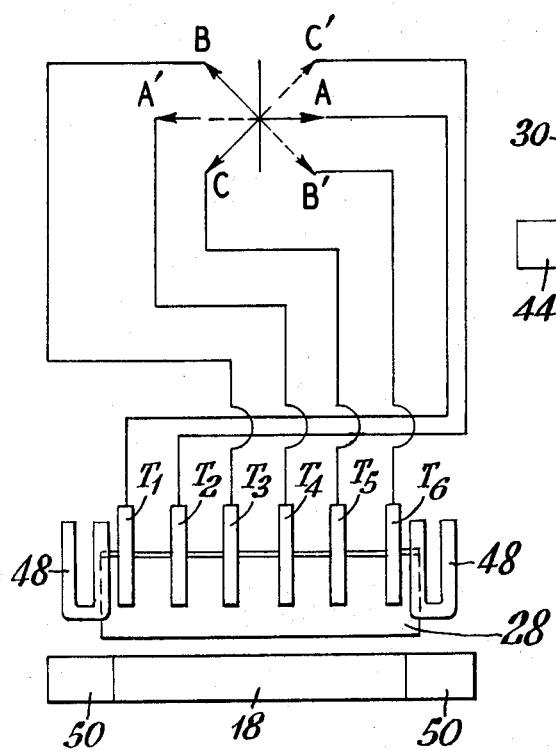
FIG. 4 is a schematic representation of an array of gaseous arc producing torches as employed in the preferred embodiment of this invention.
Figure 5:
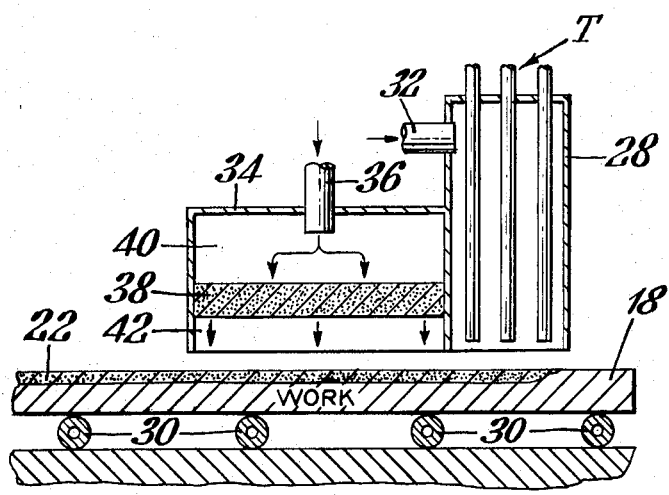
FIG. 5 is a fragmentary view in partly transverse cross section taken along line 5—5 of FIG. 3.

An example of an arc alloying apparatus used in the practice of this process is shown in FIGS. 3, 4 and 5. This apparatus was used to arc alloy portions of slabs having a typical size as follows: 18 inches wide × 34 inches long and 5 inches thick. The arc alloying of larger commercial slabs requires equipment scaled up in size but of the same general type and arrangement.

As seen in the drawings a shielding box 28 about 10 inches long and 16 inches wide encloses a group of 18 torches T arranged in three rows or arrays of six torches each. Referring back to FIG. 2, the torches shown consist of a water-cooled 1 percent-thoriated tungsten electrode 12 of about one-fourth inch diameter surrounded by a constricting water-cooled, copper gas cup or nozzle 16. The outside diameter of the gas cup is about seven-eights inch diameter and the orifice diameter is about five-sixteenths inch diameter. The electrode is set back about one-fourth inch from the nozzle orifice. These torches have a rating of about 400 amperes and when operated at 330 amperes have a power requirement of 12.5 kw each or 225 kw for the 18 torches. The torches may be spaced about 1⅛ inches center to center from each other. A forward speed in excess of 3 inches per minute can be obtained using a torch arrangement of this type. A rapidly moving system of this type allows for more uniform melting and solidification of the treated body.

The three rows of torches are shown immediately behind one another but the rows could be staggered to give more uniformity. The slab 18 to be processed is moved under the box along a horizontal path on suitable rolls 30 or other suitable means. A suitable gas source such as argon is connected at 32 to the box 28 for passage therethrough around the torches and over the slab. This assures shielding of the molten metal under the arcs. Additionally, a housing 34 may follow the torch box 28 so as to continue the protective gas shielding of the cooling metal after it has been melted and alloyed. This housing 34 may have a shielding gas inlet 36 and a diffuser 38, see FIG. 5, such as a horizontal partition of porous material dividing the interior into an upper gas inlet chamber 40 and a lower gas outlet chamber 42. Any arrangement of such protective gas shields are suitable provided they give a uniform distribution of the gas in the form of a protective blanket over the molten metal as it cools and solidifies. Alternatively, a granular flux may be employed to shield the molten puddle, as for example the case of submerged arc welding.

The slab is shown enclosed at each side by graphite block dams 50. These dams serve to prevent molten metal from running off the slab, especially when the cladding is to extend across the entire lateral expanse of the slab. The dams also improve the gas shielding of the molten metal by directing the gas flow uniformly out along the edges of the box.

In some cases, it may be desired to arc alloy only a section of a slab, for example, a section not extending across the full width of the slab. The untreated edges can be sheared off later leaving only the treated or clad section. In such cases the term "entire lateral expanse" as used herein means only that portion of the width of the slab which is intended to be treated. The step of providing a "continuous melt puddle across the entire lateral expanse of the slab" then means forming the continuous melt puddle across the actual width intended to be treated.

As shown in the FIG. 3, the torch box 28 can be moved in a side to side direction as the slab travels under the arcs. The oscillation of the torches will further insure uniformity of cladding and serve to increase the pass width allowable with a given arrangement of torches.

Oscillation can be obtained using a rotating drive wheel located in an oscillator 44 with an off center hole and push rod 46 which moves the torch box assembly back and forth on a track transverse to the slab travel direction. In regard to the 3 × 6 torch array shown, an oscillation amplitude of 2½ inches and a frequency of 19 cpm was found effective.

The directionally stable torches can be operated using alternating current or direct current, straight or reverse polarity. In the schematic diagram of FIG. 2, the single torch T is shown operating on direct current. An electrical connection 15 to the workpiece is required.

The directionally stable arcs can also be operated with alternating current. FIG. 4 shows a particularly useful arrangement for a.c. operation of the torches whereby a controlled sweep of the electric arcs is obtained and whereby no electrical connection to the workpiece is required. As seen there, A, B and C represent vectorially sources of three voltages each 120° out of phase with respect to the others; i.e., a conventional three-phase power source. If the leads to the coils of a similar three-phase source, A', B' and C' are transposed as shown, a six-phase power source is created, with each voltage source 60° electrical degrees out of phase with its two immediate neighbors.

A group of six torches, $T_1$ to $T_6$, is then connected to these six voltage sources in a proper sequence. The proper sequence is that, regardless of which terminal is connected to the first arc, the next terminal, moving either clockwise or counterclockwise around the voltage source vector diagram is connected to the next succeeding arc. Using this arrangement the 4 center arcs, $T_2$ to $T_5$, will sweep across the workpiece in predictable response to the alternating magnetic fields created by the adjacent arcs.

The tendency for the two outer arcs, $T_1$ and $T_6$, to deflect outwardly from the group can be overcome through magnetic stabilization, or pointing of these arcs towards the four center arcs. Another preferred method of controlling the outer arcs is to position U-shaped tubes or rods 48 in FIG. 4, in close proximity to the outer arcs and passing current through the tubes. To be most effective the current flow through the tubes should be in a direction opposite that of the current in the arc.

The above-described system of a six-phase AC power supply with sequential connections to a six torch array allows for the effective heating of a wider area of the slab and does away with the need for electrical connections to the workpiece. This system is more fully described in application Ser. No. 565,340 entitled "Method and Apparatus for Sweeping Electric Arcs," filed on June 29, 1966, now U.S. Pat. No. 3,336,460, issued Aug. 15, 1967. In addition, other suitable AC and DC arrangements of directionally stable arcs are set forth in that application which are suitable for use in practicing the process of this invention. The six torch array shown may be easily added to in increments of six torches to give lateral rows containing 12, 18, 24, 36 torches. In this manner a slab of any width can be effectively arc alloy clad according to the process of this invention.

A mechanical side to side movement or oscillation of the box 28 can be superimposed on the electromagnetically created sweeping of the individual arcs to give a greater width and uniformity of heating.

When one side 24 of the slab 18 has been clad, the slab may be turned over and reprocessed on the opposite side. The plate or sheet product obtained from a slab cladded on both sides will, of course, be itself stainless clad on both sides. For some purposes, however, a single side cladded product may be all that is needed for the particular use intended.

If the clad slab is to be converted to sheet product, the first step is usually to crop the ends of the slab since those parts may not have been uniformly alloyed. Slight surface scale or slag resulting from the arc alloying process may then be removed, as by shot blasting. The so-conditioned slabs may then be preheated and hot rolled to an intermediate thickness, say one-eighth of an inch. This stock can then be annealed, e.g., at about 1,450° F. for 1 hour, although material has been successfully self annealed in the coil. Descaling then follows using, for example, sodium hydride for 20 minutes followed by nitric acid and hydrofluoric acid for 10 seconds. Shot blasting may also be employed. After descaling, the surfaces can be inspected and spot conditioned.

The one-eighth inch stock can then be cold rolled directly to 0.060, 0.040, or 0.025 inch thick sheet without intermediate anneals. In fact, direct cold reduction to foil gages is possible. The material cold rolled to these final gages much more like carbon steel than like a stainless steel.

The stainless clad sheet was found to be substantially free of defects. Its mechanical properties more nearly resemble those of carbon steel than stainless steel. Nominal tensile strengths were 22,000 psi yield and 44,000 psi tensile with an elongation of 39 percent in 2 inches. Drawability and bend ductility were at least as good as type 430 stainless steel.

The corrosion resistance of a 20 percent chromium clad product was at least as good as type 430 stainless except at the edges of the sheet, which were not coated. The clad sheet was joined using conventional resistance and arc welding methods.

Figure 6:
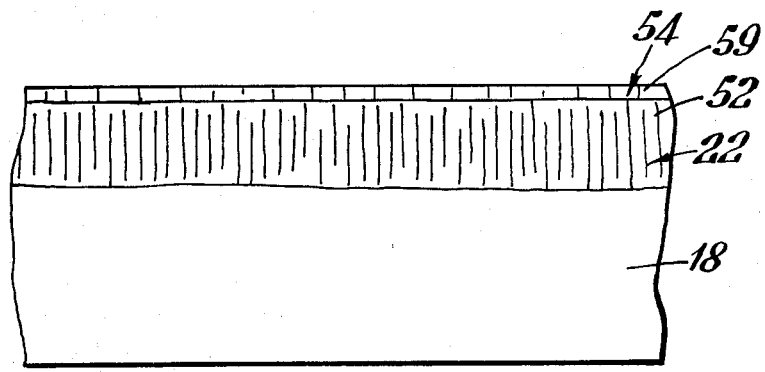
FIG. 6 is a sketch of a cross section of an "as-alloyed" body showing a clad layer produced according to the process of this invention.

When it is desired to achieve maximum surface quality and appearance of the resultant product, it is important that the entire lateral expanse of the slab surface to be treated be melted in one operation. The melting and alloying of the entire lateral expanse at one time will allow for cooling and solidification of this lateral expanse at a uniform rate. The result of such an operation is shown in FIG. 6. There a slab 18 is shown after the creation of an arc alloyed clad layer 22 according to this invention. Since the whole lateral expanse of the slab was melted in one operation, the whole molten layer solidified uniformly. Heat left the molten layer both directly downward by conduction into the cooler slab core and by radiation upwards through the slag layer covering the surface. The result is a solidification pattern marked by a parallel columnar grain structure 52. The uppermost section of the layer cooled faster as a result of its proximity to the cooler environment above resulting in a smaller layer 54 of similar parallel columnar grains 59, but of a smaller size than the underlying structure. This parallel columnar grain structure has been found to be capable of rolling into sheet product free of banding and other surface imperfections.

Figure 7:
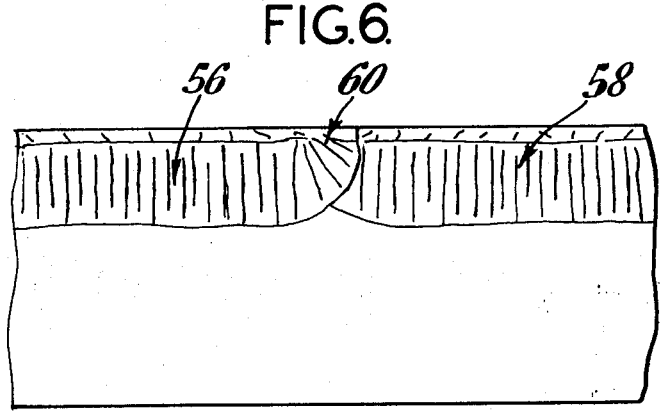
FIG. 7 is a sketch of a cross section of an "as-alloyed" body showing a possible defective structure.

When care is not taken to melt the entire lateral expanse of the slab, as when multiple passes of arc columns are used, the solidification pattern will be closer to that shown in FIG. 7. There the structure is not made up of parallel columnar grains across the entire surface, but rather only groups 56 and 58 of such parallel grains with an intersecting non-vertical structure 60 formed at the intersection passes. When rolled into sheet product, a "banded" appearance will occur with the bands located over the overlapping sections and running longitudinally down the sheet product. Such a banded product may be undesirable for applications where a high degree of uniform appearance is required, although quite acceptable for many other applications.

While the invention has been described with reference to certain preferred embodiments, it should be understood that certain modifications can be made to the embodiments described without departing from the spirit and scope of the invention. For example, an alloyed slab can be made by using multipasses or layers of alloying material and such alloying materials or the base metals being treated may be varied.

What is claimed is:

1. A method for alloying a material into at least a selected portion of the surface of a body of a base material wherein a part of the base material becomes a part of the alloy and wherein an alloy layer of substantially uniform depth and composition is formed on said selected portion of the surface of said body, comprising melting a selected continuous lateral expanse of the surface of said body onto which alloying material is introduced by establishing a plurality of arcs at current levels of from 300 to 10,000 amperes from non-consumable electrodes provided in arc devices which include a nozzle having an outlet passage, confining the arc in the nozzle, introducing gas through the nozzle and into the arc, the combination of said gas flow and said outlet passage nozzle diameter providing a directionally stable arc effluent, positioning said directionally stable arc effluents proximately to each other so that the magnetic field created around each of said arcs effects the arcs in immediate proximity therewith, energizing said arcs such that an AC voltage is applied at least to alternating arcs to produce said interacting magnetic fields among said multi arcs, spacing said nozzles from about ¼ to about 1 nozzle outside diameter from the surfaces of said body such that the length of said arcs may be swept across said selected surface portion and, varying at least one of said arc current, said gas flow, and said arc length to control the sweep of said arcs, and moving said body and said plurality of electric arcs relative to one another in a direction from one end of the body to another to advance the molten zone of alloyed material to successive lateral expanses on said body, while allowing already molten lateral expanses to cool under conditions substantially uniform across the entire selected lateral expanse.

2. The method of claim 1 in which all of said arcs are a.c. arcs.

3. The method of claim 1 in which a chromium containing material is melted and alloyed into a steel slab to produce a stainless steel clad layer on said slab.

4. The method of claim 1 in which granulated chromium-containing material is disposed over a surface of said slab and in which said so-coated slab is preheated to a temperature in the range 1,400° to 1,600° F prior to the melting operation.

5. The method of claim 4 in which granulated ferrochromium containing about 70 percent by weight chromium is disposed over the surface of a carbon steel slab and the so-coated slab melted to produce a clad layer having a chromium content of from 14 to 20 percent chromium.

6. The method of claim 4 in which a sodium silicate binder is used to hold the granulated material to the slab.

7. The method of claim 1 in which the forward rate of progress is at least three inches per minute.

8. The method of claim 1 in which at least one material melted and alloyed into the steel slab is selected from the class consisting of chromium, nickel, iron, columbium, manganese, molybdenum, tantalum and titanium.

* * * * *